(12) United States Patent
Hsu et al.

(10) Patent No.: US 8,089,631 B2
(45) Date of Patent: Jan. 3, 2012

(54) DISPLACEMENT MEASUREMENT SYSTEM AND METHOD THEREOF

(75) Inventors: Kuei-Chu Hsu, Tainan County (TW); Chii-Chang Chen, Taoyuan County (TW); Chia-Hua Chan, Taoyuan County (TW); Yin-Chieh Lai, Taichung (TW)

(73) Assignee: National Chiao Tung University, Hsinchu (TW)

( * ) Notice: Subject to any disclaimer, the term of this patent is extended or adjusted under 35 U.S.C. 154(b) by 263 days.

(21) Appl. No.: 12/483,263

(22) Filed: Jun. 12, 2009

(65) Prior Publication Data

US 2010/0284022 A1 Nov. 11, 2010

(30) Foreign Application Priority Data

May 8, 2009 (TW) ............................. 98115384 A (51) Int. Cl.
*G01B 11/02* (2006.01)
(52) U.S. Cl. .......................................... 356/499
(58) Field of Classification Search .................. 356/138, 356/399, 400, 494, 499; 250/231.14, 231.16, 250/231.18; 360/77.03
See application file for complete search history.

(56) References Cited

U.S. PATENT DOCUMENTS

| | | | |
|---|---|---|---|
| 5,493,397 A | 2/1996 | Huber et al. | |
| 5,666,196 A | 9/1997 | Ishii et al. | |
| 6,744,520 B2 | 6/2004 | Chang et al. | |
| 6,803,993 B2 * | 10/2004 | Neijzen et al. | 355/53 |

FOREIGN PATENT DOCUMENTS

TW 1270663 1/2007

OTHER PUBLICATIONS

Authored by Hwu, et al., article titled "Simutaneous detection of translational and angular displacements of micromachined elements," adopted from Applied Physics Letters 91, 221908 (2007).
Authored by Chen, et al., article titled "Nanoscale displacement measurement in a variable-air-gap optical waveguide," adopted from Applied Physics Letters 88, 161111 (2006).
Authored by Van Gorp, et al., article titled "Integrated dual grating method for extended range interferometric displacement detection in probe microscopy," adopted from Applied Physics Letters 91, 083101 (2007).
Authored by Yu, et al., article titled "Oscillating wave displacement sensor using the enhanced Goos-Hanchen effect in a symmetrical metal-cladding optical waveguide ," adopted from Optics Letters 33, 1001-1003 (2008).

* cited by examiner

*Primary Examiner* — Tarifur Chowdhury
*Assistant Examiner* — Jonathon Cook
(74) *Attorney, Agent, or Firm* — Jianq Chyun IP Office (57) ABSTRACT

A displacement measurement system including a coherent light source, a two-dimensional grating, a photo sensor, and a signal processing apparatus is provided. After the coherent light beam enters the two-dimensional grating, a zero-order light beam and a plurality of first-order diffraction beams are generated. The zero-order light beam interferes with two of the first-order beams in different directions, so that corresponding interference fringes are formed on the photo sensor. Accordingly, when the two-dimensional grating moves, displacements of the two-dimensional grating in the different directions are obtained by calculating phase differences of the interference fringes in the corresponding directions. Besides, when the two-dimensional grating rotates, the rotational angle of the two-dimensional grating is obtained from the corresponding rotational angle of a diffraction pattern of the first-order diffraction beams.

14 Claims, 8 Drawing Sheets

DISPLACEMENT MEASUREMENT SYSTEM AND METHOD THEREOF

CROSS-REFERENCE TO RELATED APPLICATION

This application claims the priority benefit of Taiwan application serial no. 98115384, filed on May 8, 2009. The entirety of the above-mentioned patent application is hereby incorporated by reference herein and made a part of specification.

BACKGROUND OF THE INVENTION

1. Field of the Invention

The present invention relates to an optical measurement system and a method thereof. More particularly, the present invention relates to a two-dimensional nanometric-scale displacement measurement system and a method thereof.

2. Description of Related Art

Generally, in a displacement measurement system with a grating, a coherent light beam is emitted into the grating, so that a plurality of diffraction beams are generated. Parts of the diffraction beams interfere with a reference light beam, so that periodic interference fringes are formed. Accordingly, when the grating moves, the displacement of the grating is calculated from variations of the above-described interference fringes. However, when the related technology was initially developed, the above-described displacement measurement system is simply used to measure the displacement in one-dimension due to the then fabricating technique of the grating.

With development of related technologies, multi-dimensional displacement measurement systems are provided. For example, in a displacement measurement system described in U.S. Pat. No. 5,666,196, gratings at a predetermined period respectively serve as alignment marks for the corresponding displacements in each dimension, so that the actual displacements are measured and recorded. Further, in a displacement measurement system described in U.S. Pat. No. 5,493,397, the actual displacements in each dimension are obtained by detecting amplitude changes of the interference fringes in each dimension. In the above-described multi-dimensional displacement measurement system, a plurality of photo sensors disposed in each dimension are used to read the amplitudes of the interference fringes for obtaining the actual displacements in each dimension, which in practice gives rise to an increase in costs and complexity of the displacement measurement system. Furthermore, the displacement measurement system having the photo sensors is difficult to be applied in practice.

SUMMARY OF THE INVENTION

One embodiment of the present invention provides a displacement measurement system in which a photo sensor is used to simultaneously measure both displacements in two dimensions and a rotational angle. By applying the displacement measurement system, the cost and the complexity can be reduced.

One embodiment of the present invention provides a displacement measurement method applied to the above-described displacement measurement system. By conducting the displacement measurement method, a photo sensor is used to simultaneously measure both displacements in the two dimensions and a rotational angle, such that the cost and the complexity can be reduced.

One embodiment of the present invention provides a displacement measurement system including a coherent light source, a two-dimensional grating, a photo sensor, and a signal processing apparatus. The coherent light source is adapted to emit a coherent light beam. The two-dimensional grating is disposed on a transmission path of the coherent light beam, such that a zero-order light beam and a plurality of first-order diffraction beams are generated after the coherent light beam enters the two-dimensional grating. The first-order diffraction beams include a first first-order diffraction beam and a second first-order diffraction beam. The photo sensor receives the zero-order light beam and the first-order diffraction beams, wherein interference fringes arranged in different directions are formed on the photo sensor by the zero-order light beam with the first first-order diffraction beam and the second first-order diffraction beam, respectively. The signal processing apparatus records each of the interference fringes arranged in different directions. When the two-dimensional grating moves, phase differences of the interference fringes in the corresponding directions are calculated to obtain displacements of the two-dimensional grating in the corresponding directions.

In an embodiment of the present invention, when the two-dimensional grating rotates, a rotational angle of the two-dimensional grating is obtained by calculating a corresponding rotational angle of a diffraction pattern of the first-order diffraction beams.

In an embodiment of the invention, the displacement measurement system further includes a plurality of reflecting elements. The reflecting elements reflect the zero-order light beam and the first-order diffraction beams to the photo sensor.

In an embodiment of the invention, the displacement measurement system further includes a plurality of optical modulators. The optical modulators are respectively disposed on transmission paths of the zero-order light beam and the first-order diffraction beams, so as to regulate the intensity of the zero-order light beam and the first-order diffraction beams entering the photo sensor.

In an embodiment of the invention, the zero-order light beam and the first first-order diffraction beam form the interference fringe arranged in a first direction on the photo sensor. The zero-order light beam and the second first-order diffraction beam form the interference fringe in a second direction on the photo sensor. Here, the first direction and the second direction are orthogonal.

In an embodiment of the invention, the two-dimensional grating is a periodic two-dimensional substrate.

In an embodiment of the invention, the wavelength of the coherent light beam is shorter than an interval between two lattice points in the periodic two-dimensional substrate.

In an embodiment of the invention, the wavelength of the coherent light beam is shorter than or equal to an interval between two lattice points in the periodic two-dimensional substrate.

In an embodiment of the invention, the periodic two-dimensional substrate is a periodically-arranged hexagonal photonic crystal glass (HPCG).

One embodiment of the present invention provides a displacement measurement method including following steps. First, a two-dimensional grating is provided. Next, a coherent light beam is emitted into the two-dimensional grating, so that a zero-order light beam and a plurality of first-order diffraction beams are generated, wherein the first-order diffraction beams comprise a first first-order diffraction beam and a second first-order diffraction beam. Thereafter, the zero-order light beam and the first-order diffraction beams are received by a photo sensor receives, wherein the zero-order light beam respectively forms corresponding interference fringes arranged in different directions on the photo sensor with the first first-order diffraction beam and the second first-order diffraction beam. Accordingly, when the two-dimensional grating moves, phase differences of the interference fringes in the corresponding directions are calculated to obtain displacements of the two-dimensional grating in the corresponding directions.

In an embodiment of the invention, the displacement measurement method further includes a step of reflecting the zero-order light beam and the first-order diffraction beams to the photo sensor before the step of receiving the zero-order light beam and the first-order diffraction beams by the photo sensor is performed.

In an embodiment of the invention, the displacement measurement method further includes a step of regulating the intensity of the zero-order light beam and the first-order diffraction beams entering the photo sensor before the step of receiving the zero-order light beam and the first-order diffraction beams by the photo sensor is performed.

In view of the above, one photo sensor is used to sense changes of the interference fringes in the displacement measurement system according to an embodiment consistent with the present invention, and the phase differences of the interference fringes are calculated to obtain displacements of the two-dimensional grating in the corresponding directions. Furthermore, in an embodiment of the present invention, the rotational angle of the two-dimensional grating is obtained according to the corresponding rotational angle of the diffraction pattern of the first-order diffraction beams. Therefore, one photo sensor is used in the displacement measurement system to simultaneously measure both the displacements in two dimensions and the rotational angle, so that not only the manufacturing cost but also the complexity of fabrication is reduced.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
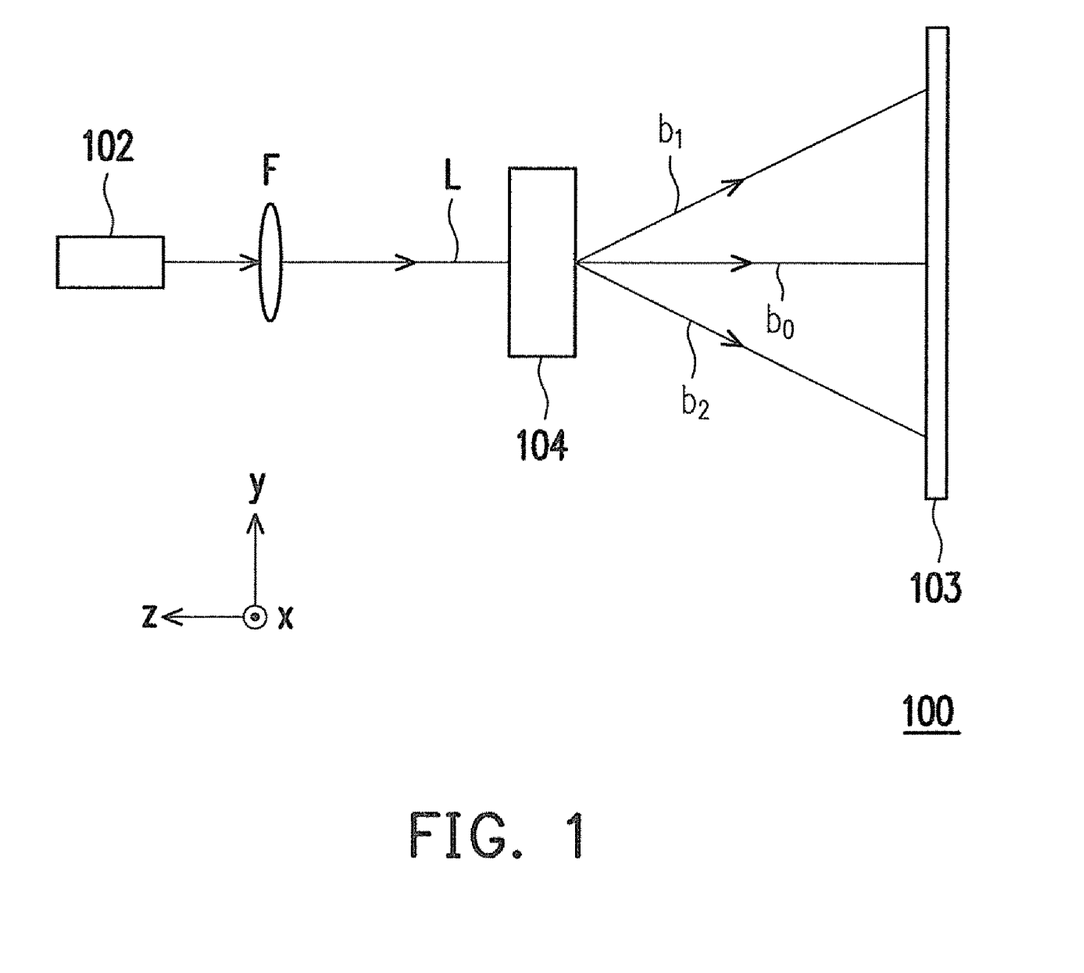
FIG. 1 is a schematic view illustrating a displacement measurement system according to one embodiment of the present invention.

FIG. 1 is a schematic view illustrating a displacement measurement system according to one embodiment of the present invention. Referring to FIG. 1, in the present embodiment, the displacement measurement system 100 includes a coherent light source 102, a screen 103, a two-dimensional grating 104, and a spherical lens F.

The coherent light source 102 is adapted to emit a coherent light beam L. The two-dimensional grating 104 is disposed on a transmission path of the coherent light beam L, so that a zero-order light beam $b_0$ and a plurality of first-order diffraction beams are generated and projected on the screen 103 after the coherent light beam L enters the two-dimensional grating 104. Accordingly, a diffraction pattern is formed. Here, the first-order diffraction beams include a first first-order diffraction beam $b_1$ and a second first-order diffraction beam $b_2$.

Specifically, in the present embodiment, the coherent light source 102, for example, is a 633-nm He—Ne laser adapted to emit the coherent laser beam L having a wavelength of 633 nm. The coherent laser beam L passes through the spherical lens F having a focus of 125 millimeter (mm.) and focused on the two-dimensional grating 104, so that the diffraction pattern is formed. In the present embodiment, the two-dimensional grating 104, for example, is a hexagonal photonic crystal glass (HPCG).

Figure 2A:
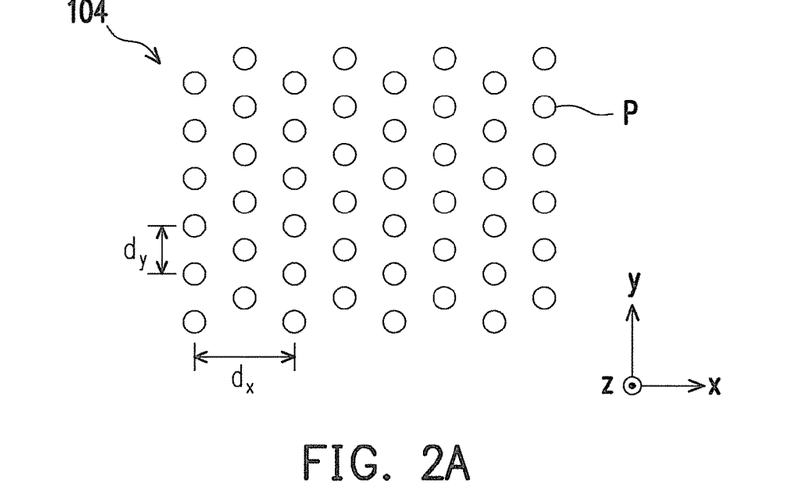
FIG. 2A is a schematic cross-sectional view of a HPCG structure according to one embodiment of the present invention.
Figure 2B:
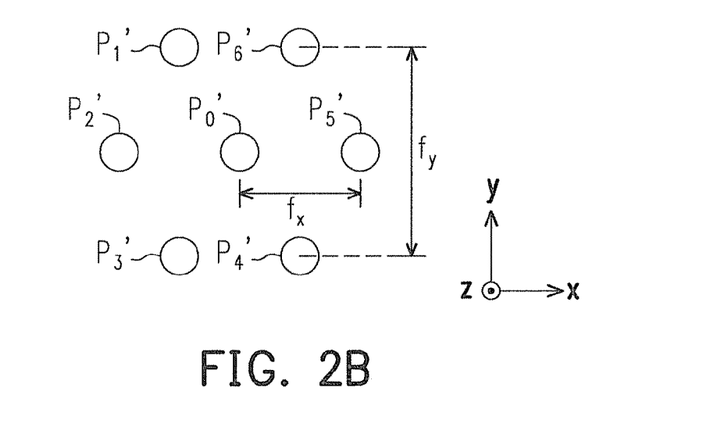
FIG. 2B is the diffraction pattern formed on the screen after the coherent light beam enters the HPCG.
Figure 2C:
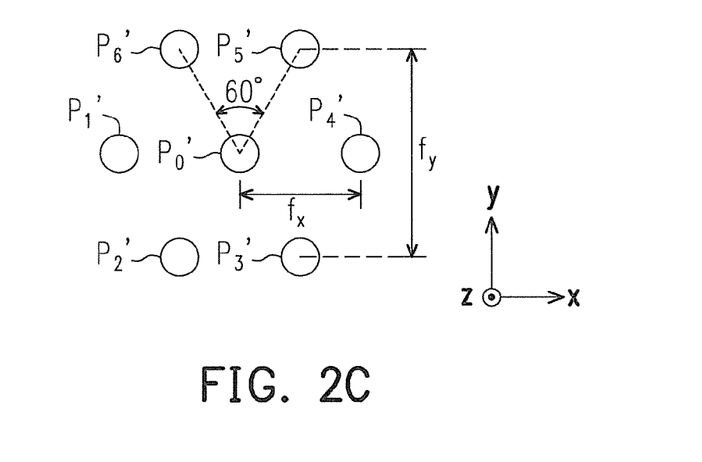
FIG. 2C is the diffraction pattern formed on the screen after the HPCG rotates by 60 degrees relative to the Z-direction in the counter-clockwise direction.

FIG. 2A is a schematic cross-sectional view of a HPCG structure according to one embodiment of the present invention. Referring to FIG. 2A, lattice points P of the HPCG 104 are periodically arranged. An interval between each of the lattice points P in the X-direction is $d_x$, and an interval between each of the lattice points P in the Y-direction is $d_y$. In the present embodiment, an exemplary method for forming the HPCG 104 includes following steps. First, a plurality of nanometric-scale particles are tightly arranged to form a single layer on a glass. Next, the glass is etched, so that the HPCG 104 is formed. FIG. 2B is the diffraction pattern formed on the screen 103 after the coherent light beam L enters the HPCG 104. Referring to FIG. 2B, a center diffracted spot $P'_0$ corresponds to the zero-order light beam $b_0$, and six first-order diffracted spots $P'_1 \sim P'_6$ therearound respectively correspond to the first-order diffraction beams. Accordingly, in the displacement measurement system 100, when the HPCG 104 rotates, a rotational angle thereof is obtained through calculating a corresponding rotational angle of the diffraction pattern on the screen 103. For example, when the HPCG 104 rotates by 60 degrees relative to the Z-direction in the counter-clockwise direction, the first-order diffracted spots P'$_1$~P'$_6$ shown in FIG. 2B also rotate by 60 degrees relative to the Z-direction in the counter-clockwise direction, as shown in FIG. 2C. FIG. 2C is the diffraction pattern formed on the screen 103 after the HPCG 104 rotates by 60 degrees relative to the Z-direction in the counter-clockwise direction. Referring to FIG. 2C, after the HPCG 104 rotates 60 by degrees relative to the Z-direction in the counter-clockwise direction, the center diffracted spot P'$_0$ still stays at the center of the diffraction pattern, but positions of the six first-order diffracted spots P'$_1$~P'$_6$ therearound are apparently different from the positions thereof before the HPCG 104 rotates. For example, after the HPCG 104 rotates by 60 degrees relative to the Z-direction in the counter-clockwise direction, the position of the first-order diffracted spot P'$_6$ turns to the position of the first-order diffracted spot P'$_1$ shown in FIG. 2B, and the position of the first-order diffracted spot P'$_5$ turns to the position of the first-order diffracted spot P'$_6$ shown in FIG. 2B. That is, the six first-order diffracted spots P'$_1$~P'$_6$ shown in FIG. 2C rotate by 60 degrees relative to the Z-direction in the counter-clockwise direction.

Accordingly, the rotational angle of the HPCG 104 is obtained through calculating the corresponding rotational angle by which the six first-order diffracted spots P'$_1$~P'$_6$ therearound rotate relative to the center diffracted spot P'$_0$ in FIG. 2B. That is, in the displacement measurement system 100, the rotational angle of the two-dimensional grating 104 is obtained according to the corresponding rotational angle of the diffraction pattern of the first-order diffraction beams.

In the present embodiment, the transmittance rate of the HPCG 104 is expressed as the following equation (1), $$t(x, y) = g(x, y) \otimes \left[ comb\left(\frac{x}{d_x}\right) comb\left(\frac{y}{d_y}\right) + comb\left(\frac{x}{d_x} - \frac{1}{2}\right) comb\left(\frac{y}{d_y} - \frac{1}{2}\right) \right] \quad (1)$$

wherein t(x,y) is the transmittance rate of the HPCG 104, $d_x$ and $d_y$ are respectively the intervals between each of the lattice points P in the X-direction and in the Y-direction (shown in FIG. 2A), and g(x,y) is the transmittance rate of one unit cell.

The transmittance rate of the HPCG 104 after Fourier transformation is expressed as the following equation (2), $$u_f(f_x, f_y) = \sum_{m,n} G\left(f_x - \frac{n}{d_x}, f_y - \frac{m}{d_y}\right)(1 + e^{i\pi(m+n)}) \quad (2)$$

wherein $f_x$ and $f_y$ are respectively the intervals between each of the first-order diffracted spots in the X-direction and in the Y-direction (shown in FIG. 2B), and the function G is Fourier transformation of g(x,y). Furthermore, equation (2) shows the Fourier transformation $u_f(f_x,f_y)$ of the transmittance rate t(x,y), which is also the scaled far field distribution of the diffraction beams.

Accordingly, the Fraunhofer far field distribution pattern formed after the coherent light beam L enters the periodically-arranged HPCG 104 is simply the Fourier spectrum of the HPCG 104. For example, the diffraction pattern shown in FIG. 2B is the Fourier spectrum of the HPCG 104 shown in FIG. 2A. Moreover, as shown in FIG. 2B, the structure of the periodically-arranged HPCG 104 is also a periodically arranged hexagonal structure after Fourier transformation.

Figure 3:
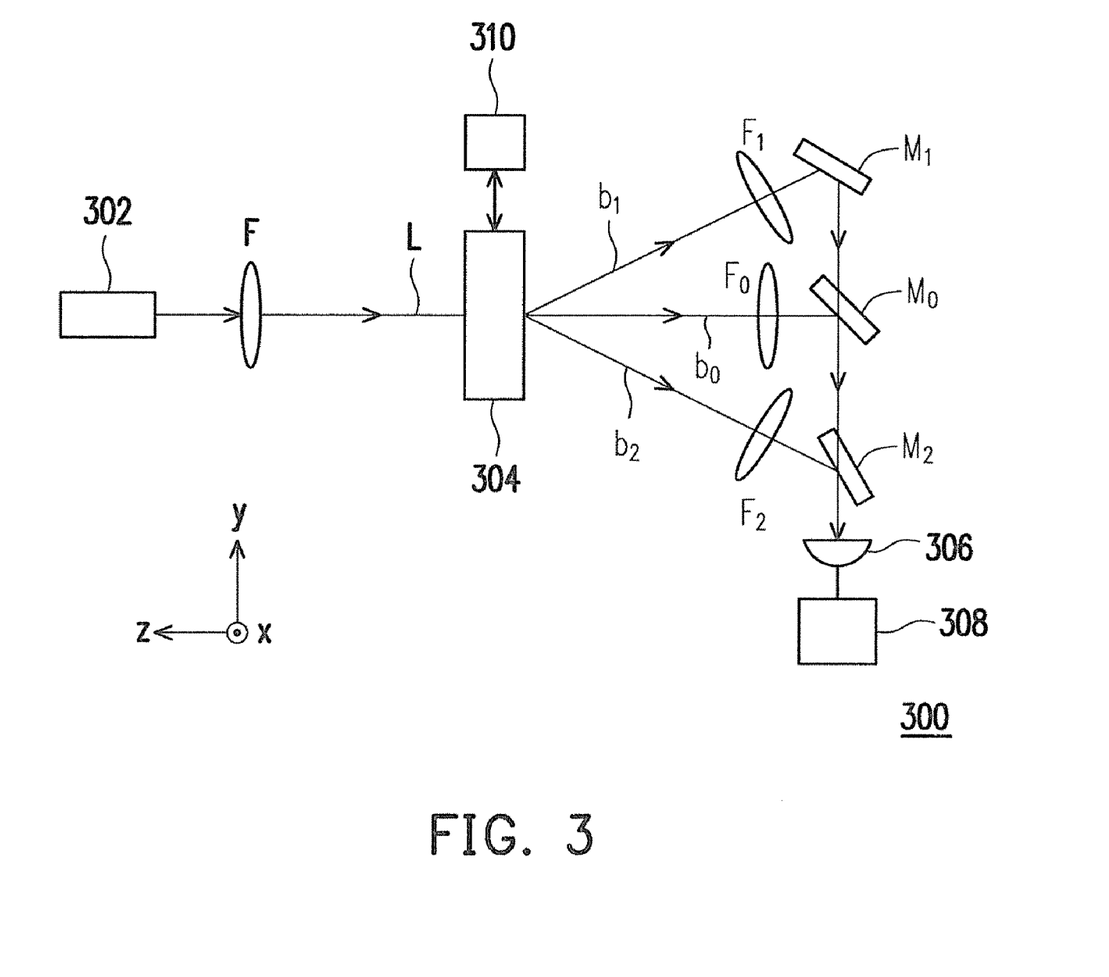
FIG. 3 is a schematic view illustrating a displacement measurement system according to one embodiment of the present invention.

FIG. 3 is a schematic view illustrating a displacement measurement system according to one embodiment of the present invention. Referring to FIG. 3, the displacement measurement system 300 includes a coherent light source 302, a two-dimensional grating 304, a photo sensor 306, a signal processing apparatus 308, a plurality of spherical lenses $F_0$, $F_1$, $F_2$, and F, a plurality of reflecting elements $M_0$, $M_1$, and $M_2$, and a Michelson interferometer 310. Furthermore, same or similar reference numbers used in FIG. 3 and in FIG. 1 represent the same or the like elements. Accordingly, no further description thereof is provided hereinafter.

In the present embodiment, the coherent light source 302 emits the coherent laser beam L having a wavelength of 633 nm. After passing through the spherical lens F, the coherent laser beam L is focused on the periodically-arranged HPCG 304, so that a zero-order light beam $b_0$ and a plurality of first-order diffraction beams are generated. Here, the first-order diffraction beams include a first first-order diffraction beam $b_1$ and a second first-order diffraction beam $b_2$.

Next, the zero-order light beam $b_0$, the first first-order diffraction beam $b_1$, and the second first-order diffraction beam $b_2$ are taken as an example to describe the way to calculate displacements of the HPCG 304 in corresponding directions by using phase differences of interference fringes of the zero-order light beam $b_0$, the first first-order diffraction beam $b_1$, and the second first-order diffraction beam $b_2$ in the displacement measurement system 300 when the HPCG 304 moves.

Figure 4A:
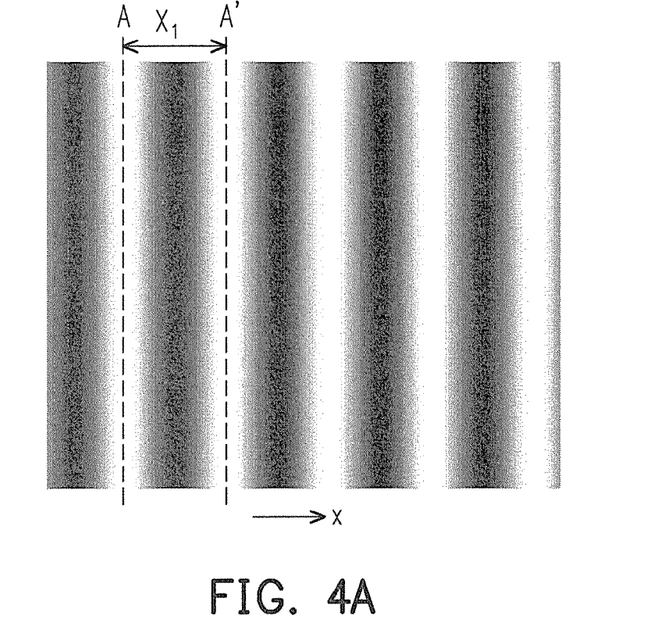
FIG. 4A shows the interference fringes formed on the photo sensor due to the zero-order light beam interfering with the first first-order diffraction beam, wherein the interference fringes are arranged along the X-direction.
Figure 4B:
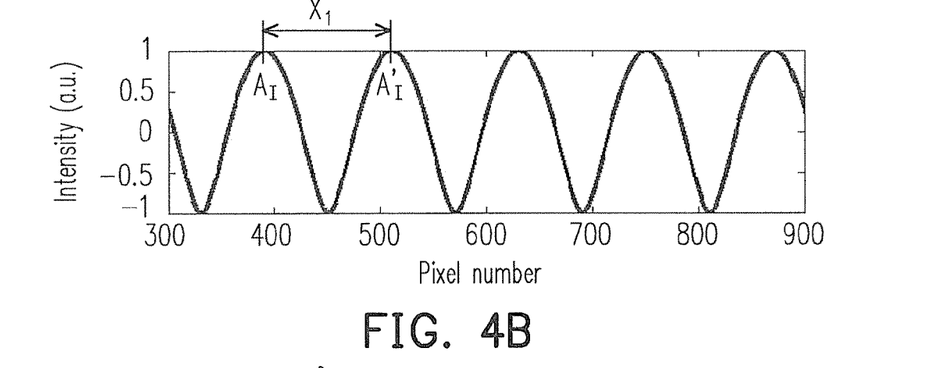
FIG. 4B is an intensity distribution diagram showing the interference fringes depicted in FIG. 4A in the X-direction.
Figure 4C:
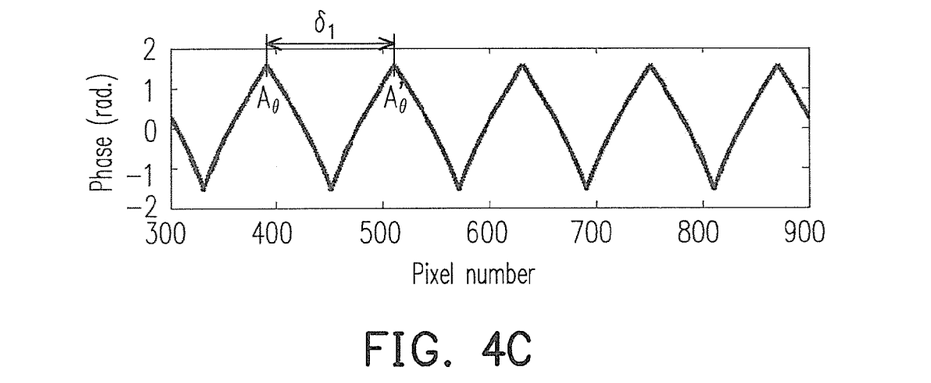
FIG. 4C is a phase distribution diagram showing the interference fringes depicted in FIG. 4A in the X-direction.

FIG. 4A shows the interference fringes formed on the photo sensor 306 due to the zero-order light beam $b_0$ interfering with the first first-order diffraction beam $b_1$, wherein the interference fringes are arranged along the X-direction. FIG. 4B is an intensity distribution diagram showing the interference fringes depicted in FIG. 4A in the X-direction. FIG. 4C is a phase distribution diagram showing the interference fringes depicted in FIG. 4A in the X-direction.

Referring to FIG. 3 and FIG. 4A, taking the zero-order light beam $b_0$ and the first first-order diffraction beam $b_1$ as an example, after the coherent light beam L enters the HPCG 304, the zero-order light beam $b_0$ and the first first-order diffraction beam $b_1$ are generated. Next, the zero-order light beam $b_0$ and the first first-order diffraction beam $b_1$ respectively pass through the spherical lenses $F_0$ and $F_1$, so as to be focused on the reflecting elements $M_0$ and $M_1$. Thereafter, the reflecting elements $M_0$ and $M_1$ reflect the zero-order light beam $b_0$ and the first first-order diffraction beam $b_1$ to the photo sensor 306.

In the present embodiment, the reflecting element $M_1$, for example, reflects most of the first first-order diffraction beam $b_1$ to the photo sensor 306. The reflecting element $M_0$, for example, is a reflector having the transmittance rate of 50%, so that a part of the first first-order diffraction beam $b_1$ is transmitted to the photo sensor 306, while a part of the zero-order light beam $b_0$ is reflected to the photo sensor 306. In the present embodiment, the photo sensor 306 is a 440×480 monochrome charge coupled device (CCD) with a pixel width of 7.15-μm and is used to sense the interference fringes. After the zero-order light beam $b_0$ and the first first-order diffraction beam $b_1$ enter the photo sensor 306, the zero-order light beam $b_0$ interferes with the first first-order diffraction beam $b_1$, so that the interference fringes arranged along the X-direction are formed on the photo sensor 306, as shown in FIG. 4A. Next, the signal processing apparatus 308 coupled to the photo sensor 306 records the interference fringes formed by the zero-order light beam $b_0$ interfering with the first first-order diffraction beam $b_1$.

It will be apparent to those skilled in the art that the interference fringes formed by the zero-order light beam $b_0$ interfering with the first first-order diffraction beam $b_1$ in the X-direction on the photo sensor 306 are exemplary, and the present invention is not limited thereto.

Figure 5A:
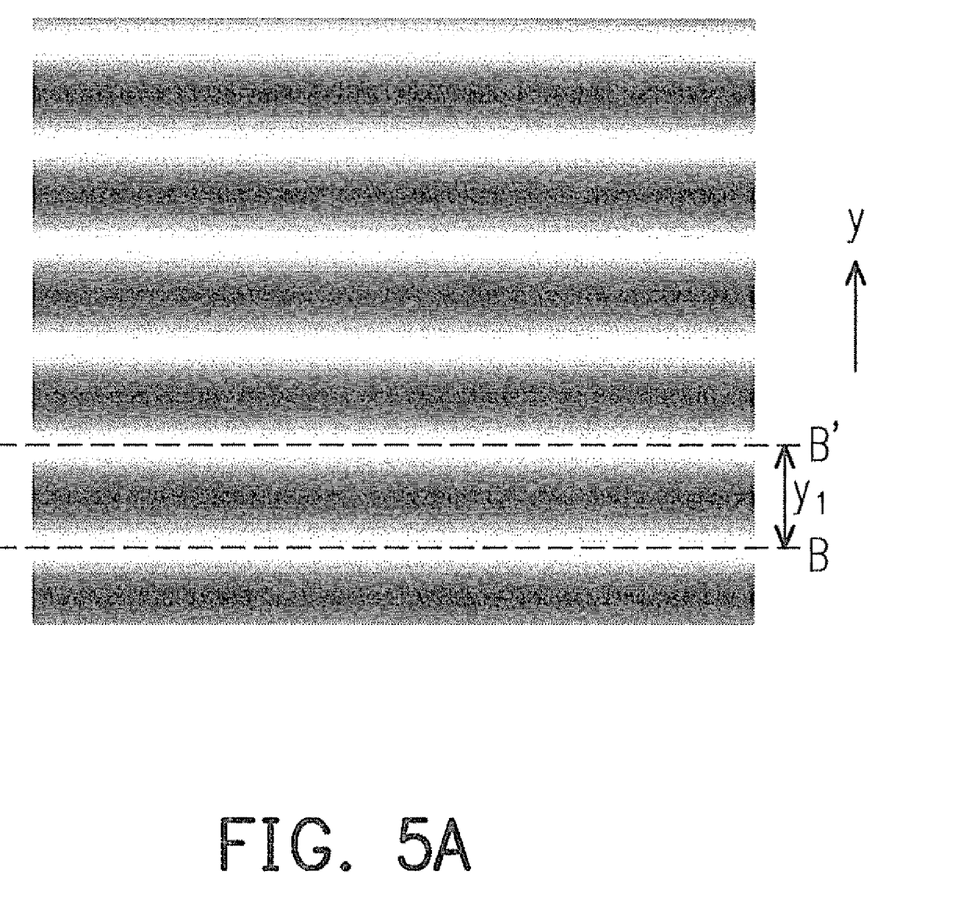
FIG. 5A shows the interference fringes formed on the photo sensor due to the zero-order light beam interfering with the second first-order diffraction beam, wherein the interference fringes are arranged along the Y-direction.
Figure 5B:
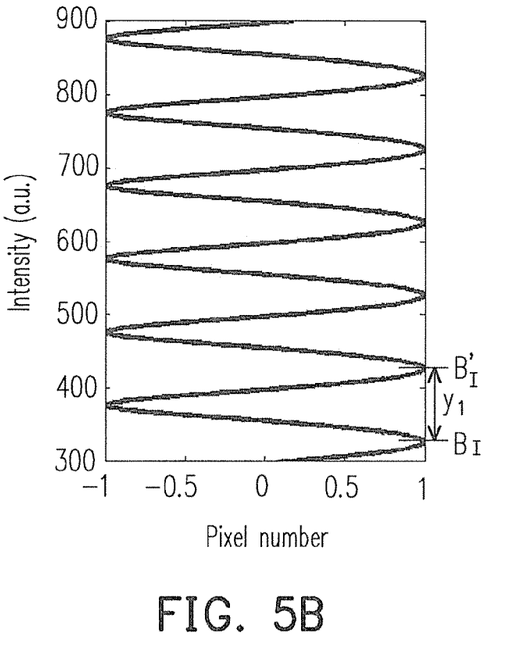
FIG. 5B is an intensity distribution diagram showing the interference fringes depicted in FIG. 5A in the Y-direction.
Figure 5C:
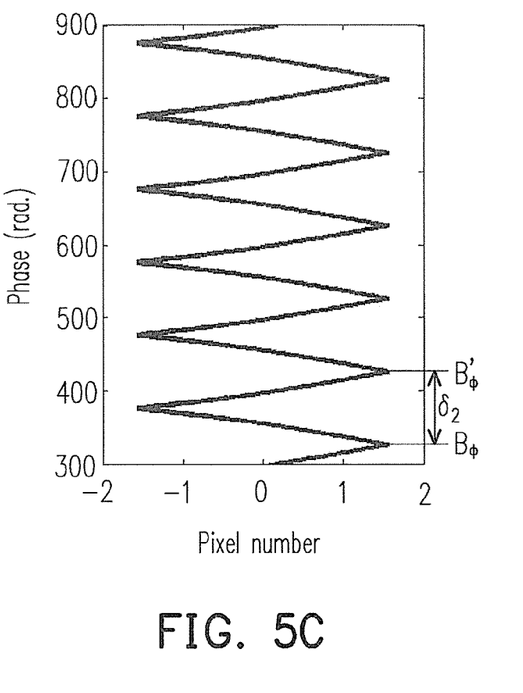
FIG. 5C is a phase distribution diagram showing the interference fringes depicted in FIG. 5A in the Y-direction.

FIG. 5A shows the interference fringes formed on the photo sensor 306 due to the zero-order light beam $b_0$ interfering with the second first-order diffraction beam $b_2$, wherein the interference fringes are arranged along the Y-direction. FIG. 5B is an intensity distribution diagram showing the interference fringes depicted in FIG. 5A in the Y-direction. FIG. 5C is a phase distribution diagram showing the interference fringes depicted in FIG. 5A in the Y-direction.

Referring to FIG. 3 and FIG. 5A, similarly, after the coherent light beam L enters the HPCG 304, the second first-order diffraction beam $b_2$ is generated. Next, the second first-order diffraction beam $b_0$ passes through the spherical lens $F_2$, so as to be focused on the reflecting element $M_2$. Thereafter, the reflecting element $M_2$ reflects the second first-order diffraction beam $b_2$ to the photo sensor 306. After the second first-order diffraction beam $b_2$ enters the photo sensor 306, the zero-order light beam $b_0$ interferes with the second first-order diffraction beam $b_2$, so that the interference fringes arranged along the Y-direction are formed on the photo sensor 306, as shown in FIG. 5A. Next, the signal processing apparatus 308 coupled to the photo sensor 306 records the interference fringes formed by the zero-order light beam $b_0$ interfering with the second first-order diffraction beam $b_2$.

In the present embodiment, the reflecting element $M_2$, for example, is a reflector having the transmittance rate of 50%, so that parts of the zero-order light beam $b_0$ and the first first-order diffraction beam $b_1$ are transmitted to the photo sensor 306, while a part of the second first-order diffraction beam $b_2$ is reflected to the photo sensor 306.

It will be apparent to those skilled in the art that the interference fringes formed by the zero-order light beam $b_0$ interfering with the second first-order diffraction beam $b_2$ in the Y-direction on the photo sensor 306 are exemplary, and the present invention is not limited thereto. In practice, the photo sensor 306 simultaneously senses the interference fringes shown in FIG. 4A and FIG. 5A. Apparently, the displacement measurement system 300 is not limited to sense the interference fringes respectively arranged along the two orthogonal directions.

Figure 6:
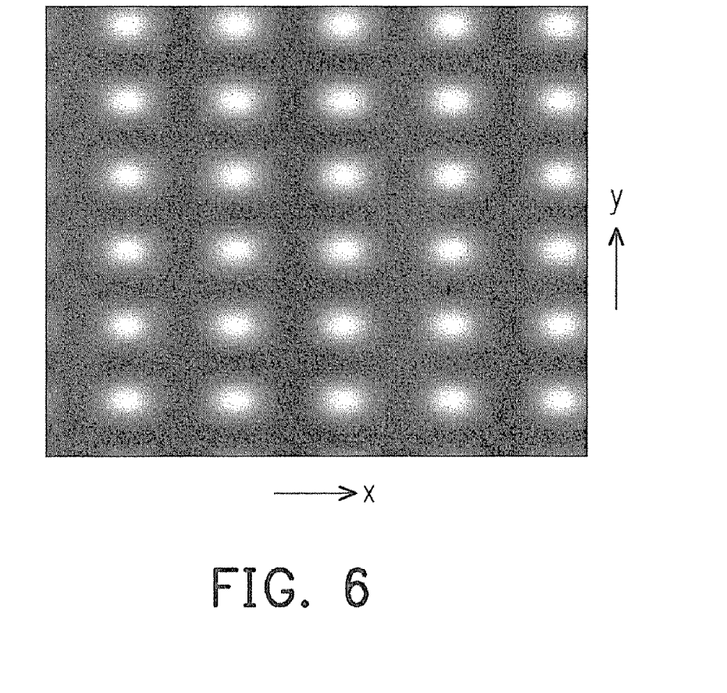
FIG. 6 shows the interference fringes formed on the photo sensor due to the zero-order light beam interfering with the first first-order diffraction beam and the second first-order diffraction beam.

FIG. 6 shows the interference fringes formed on the photo sensor 306 due to the zero-order light beam $b_0$ interfering with the first first-order diffraction beam $b_1$ and the second first-order diffraction beam $b_2$. Referring to FIG. 6, in the present embodiment, the interference pattern formed on the photo sensor 306 due to the zero-order light beam $b_0$ interfering with the first first-order diffraction beam $b_1$ and the second first-order diffraction beam $b_2$ is a chessboard-like interference pattern. In the present embodiment, it should be noted that one photo sensor 306 is used to simultaneously sense the interference fringes arranged in different directions in the displacement measurement system 300. Accordingly, not only the cost of the displacement measurement system 300 but also the complexity thereof is reduced.

When the HPCG 304 moves, the phase of the scaled far field distribution implies the displacement. The photo sensor 306 senses variations of the interference fringes, and the phase difference of the interference fringes is calculated in the signal processing apparatus 308, so that the displacement of the HPCG 304 in the corresponding direction is obtained.

Specifically, when there are the displacements of the HPCG 304 in the two dimensions, the scaled far field distribution is expressed as the following equation (3), $$u_j'(f_x,f_y)=u_j(f_x,f_y)e^{i2\pi f_x x1}e^{i2\pi f_y y1}=u_{0j}(f_x,f_y)e^{i\delta_0}+u_{1j}(f_x,f_y)e^{i\delta_1}+u_{2j}(f_x,f_y)e^{i\delta_2}+ \quad (3)$$

wherein $u_{0j}(f_x,f_y)$, $u_{1j}(f_x,f_y)$, and $u_{2j}(f_x,f_y)$ are respectively the original scaled far field distributions of the zero-order light beam $b_0$, the first first-order diffraction beam $b_1$, and the second first-order diffraction beam $b_2$, and $\delta_0$, $\delta_1$, and $\delta_2$ are respectively the phase differences of the zero-order light beam $b_0$, the first first-order diffraction beam $b_1$, and the second first-order diffraction beam $b_2$ due to the displacements of the HPCG 304.

When the HPCG 304 moves, the corresponding interference fringes are still the same as before, but the displacements of the HPCG 304 have been implied by the phase differences of the scaled far field distributions. Accordingly, the first first-order diffraction beam $b_1$ and the second first-order diffraction beam $b_2$ respectively interfere with the zero-order light beam $b_0$, so that the interference fringes are formed. Next, the displacements of the HPCG 304 implied by the phase differences of the scaled far field distributions are obtained by calculating the corresponding phase differences of the interference fringes.

The interference fringes arranged in X-direction are taken as an example. Please refer to FIG. 3 and FIGS. 4A-4C. In FIG. 4A, before the HPCG 304 moves, the amplitude and the phase of the wavefront A of the bright interference fringe respectively correspond to the peak $A_I$ in FIG. 4B and the apex $A_\Theta$ in FIG. 4C. After the HPCG 304 moves, the corresponding interference patterns are still the same as before, but the position of the wavefront A of the bright interference fringe right shifts to the position of the wavefront A' of the bright interference fringe. Meanwhile, the amplitude and the phase of the wavefront A' of the bright interference fringe respectively correspond to the peak $A_I'$ in FIG. 4B and the apex $A_\Theta'$ in FIG. 4C. Accordingly, the photo sensor 306 senses variations of the interference fringes in FIG. 4A, and the phase difference $\delta_1$ of the interference fringe is calculated in the signal processing apparatus 308, so that the displacement $X_1$ of the HPCG 304 in the X-direction is obtained.

Similarly, referring to FIG. 3 and FIGS. 5A-5C, when the photo sensor 306 senses the variations of the interference fringes in FIG. 4A, the photo sensor 306 also senses variations of the interference fringes in FIG. 5A simultaneously. Accordingly, the phase difference $\delta_2$ of the interference fringe is calculated in the signal processing apparatus 308, so that the displacement $X_2$ of the HPCG 304 in the Y-direction is obtained.

In the present embodiment, the interference fringes in FIG. 4A and FIG. 5A are respectively transformed to Fourier spectrums after Fourier transformation is performed by the signal processing apparatus 308. Next, the real part of the scaled far field distribution is filtered by the signal processing apparatus 308. Thereafter, the scaled far field distribution respectively undergoes inverse Fourier transformation through the signal processing apparatus 308, so that periodic curves shown in FIG. 4B and FIG. 5B are obtained. The phase differences $\delta_1$ and $\delta_2$ are respectively determined upon the phase angle of the complex distribution processed by the signal processing apparatus 308.

Table 1 shows one-dimensional position monitoring statistics according to the displacement in one period. Table 1 lists the statistical data of average displacement and standard deviation of total 50 measurements per phase shift. In the present embodiment, the interval between lattice points of the HPCG 304 is approximately 1357 nanometers.

TABLE 1

| | Phase Shift (degree) | | | | |
|---|---|---|---|---|---|
| | 2 | 5 | 60 | 180 | 360 |
| Average Displacement (nm) | 8.12 | 19.06 | 439.67 | 664.51 | 1357.51 |
| Standard Deviation (nm) | 0.94 | 1.65 | 5.70 | 12.63 | 18.03 |

As known from Table 1, if the displacements calculated from the signal processing apparatus 308 are compared with the displacements read from the Michelson interferometer 310, the standard deviations are within the required standard. Accordingly, the displacement measurement system 300 of the present embodiment accomplishes accuracy in a nanometric scale.

Figure 7:
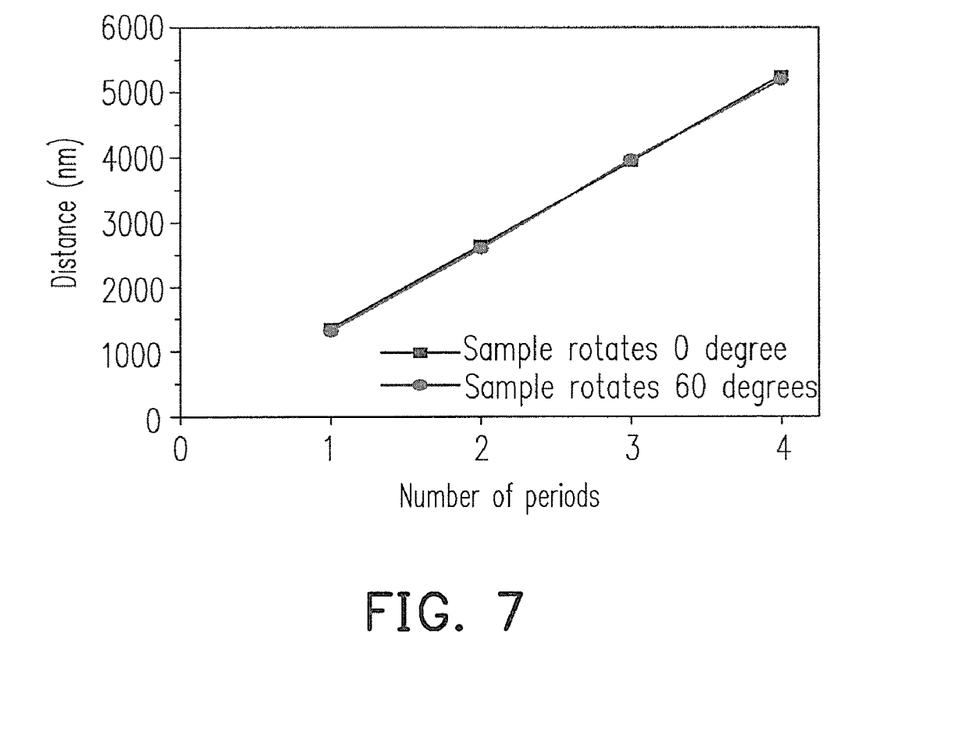
FIG. 7 shows the correlation between the number of periods and an average translational distance when the HPCG crystal axis is placed at 0° and 60°.

FIG. 7 shows the correlation between the number of periods and an average translational distance when the HPCG crystal axis is placed at 0° and 60°. Referring to FIG. 2A and FIG. 7, in the present embodiment, the HPCG 304 is arranged as shown in FIG. 2A, and the interval between lattice points of the HPCG 304 is approximately 1357 nanometers. Since the HPCG 304 is periodically arranged, if the HPCG 304 after rotating by zero degree is compared with the HPCG 304 after rotating by 60 degrees, the HPCG 304 period is still the same as before.

In addition to the above-described displacement measurement system, a displacement measurement method is also provided in an embodiment of the present invention.

Figure 8:
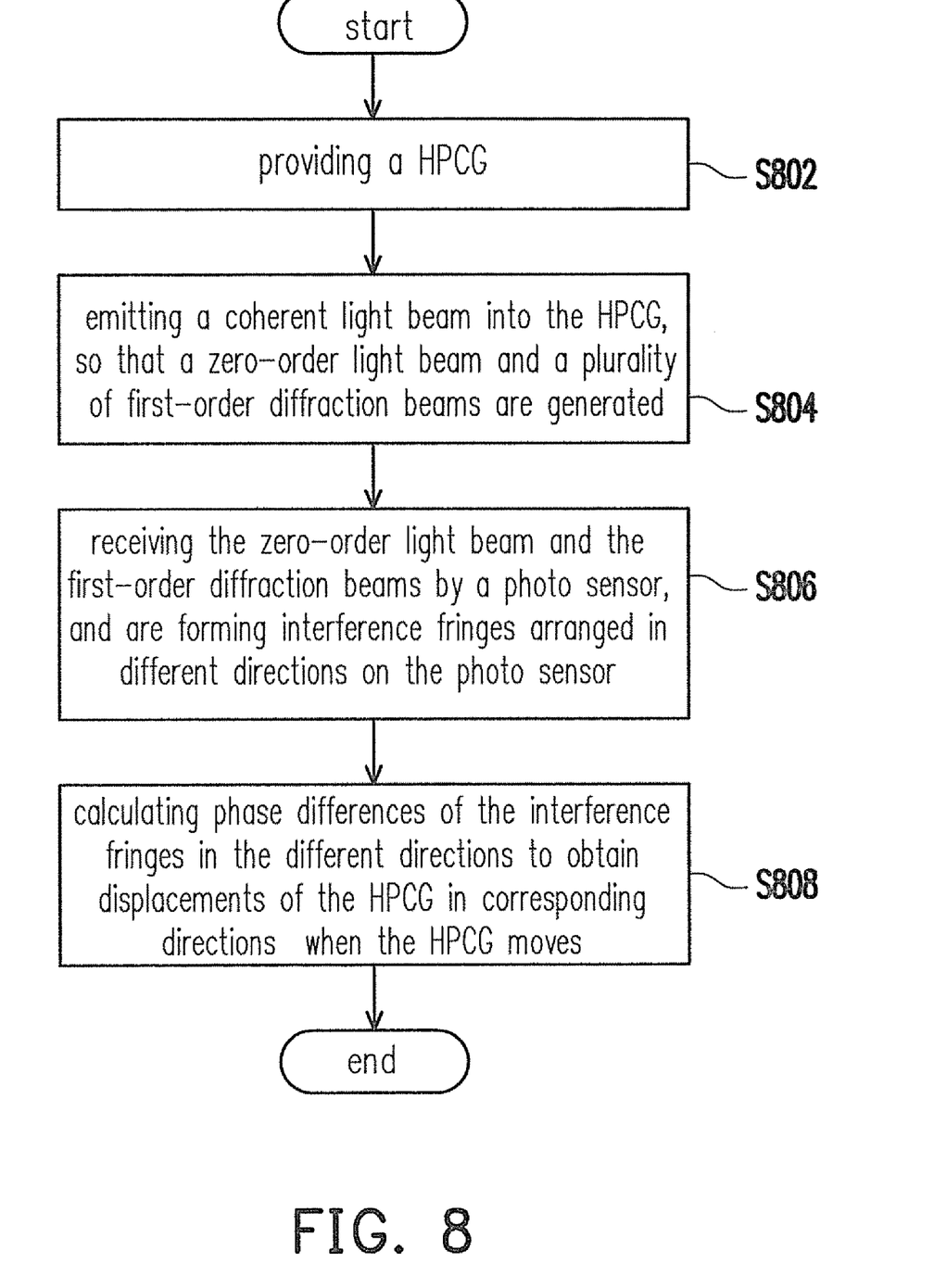
FIG. 8 is a flowchart of a displacement measurement method of the displacement measurement system according to an embodiment of the present invention.

FIG. 8 is a flowchart of a displacement measurement method of the displacement measurement system 300 according to an embodiment of the present invention. Referring to FIG. 8, first of all, a hexagonal photonic crystal glass (HPCG) is provided in step S802. Next, in step S804, a coherent light beam is emitted into the HPCG, so that a zero-order light beam and a plurality of first-order diffraction beams are generated. Thereafter, in step S806, the zero-order light beam and the first-order diffraction beams are received by a photo sensor, and interference fringes arranged in different directions are formed on the photo sensor. Finally, in step S808, when the HPCG moves, phase differences of the interference fringes in the different directions are calculated to obtain displacements of the HPCG in corresponding directions. Sufficient teaching, suggestion, and implementation illustration of the method can be obtained from the above embodiments, and therefore the method is not further described.

In view of the above, one photo sensor is used to simultaneously sense the interference fringes due to the zero-order light beam interfering with the first-order diffraction beams in different directions in an embodiment of the invention, and the phase differences of the interference fringes are calculated by the signal processing apparatus to obtain the displacements of the two-dimensional grating in the corresponding directions. Furthermore, if the displacements calculated from the signal processing apparatus are compared with the displacements read from the Michelson interferometer, the standard deviations are within the required standard. Accordingly, the displacement measurement system in an embodiment of the present invention accomplishes accuracy in a nanometric scale, and the cost of measurement is reduced. Besides, in another embodiment of the present invention, the rotational angle of the two-dimensional grating is obtained according to the corresponding rotational angle of the diffraction pattern of the first-order diffraction beams in the displacement measurement system.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A displacement measurement system, comprising:
a coherent light source adapted to emit a coherent light beam;
a two-dimensional grating disposed on a transmission path of the coherent light beam, the coherent light beam entering the two-dimensional grating to generate a zero-order light beam and a plurality of first-order diffraction beams, wherein the first-order diffraction beams comprise a first first-order diffraction beam and a second first-order diffraction beam, wherein the two-dimensional grating is a periodic two-dimensional substrate, and the periodic two-dimensional substrate is a periodically-arranged hexagonal photonic crystal glass (HPCG);
a photo sensor receiving the zero-order light beam and the first-order diffraction beams, wherein the zero-order light beam respectively forms interference fringes arranged in different directions on the photo sensor with the first first-order diffraction beam and the second first-order diffraction beam; and
a signal processing apparatus recording each of the interference fringes arranged in different directions, wherein displacements of the two-dimensional grating in the different directions are obtained by calculating phase differences of the interference fringes in corresponding directions when the two-dimensional grating moves.

2. The displacement measurement system as claimed in claim 1, wherein a rotational angle of the two-dimensional grating is obtained by calculating a corresponding rotational angle of a diffraction pattern of the first-order diffraction beams when the two-dimensional grating rotates.

3. The displacement measurement system as claimed in claim 1, further comprising a plurality of reflecting elements, wherein the reflecting elements reflect the zero-order light beam and the first-order diffraction beams to the photo sensor.

4. The displacement measurement system as claimed in claim 1, further comprising a plurality of optical modulators, wherein the optical modulators are respectively disposed on transmission paths of the zero-order light beam and the first-order diffraction beams, so as to regulate the intensity of the zero-order light beam and the first-order diffraction beams entering the photo sensor.

5. The displacement measurement system as claimed in claim 1, wherein the zero-order light beam and the first first-order diffraction beam form the interference fringe arranged in a first direction on the photo sensor, the zero-order light beam and the second first-order diffraction beam form the interference fringe arranged in a second direction on the photo sensor, and the first direction and the second direction are orthogonal.

6. The displacement measurement system as claimed in claim 1, wherein the wavelength of the coherent light beam is shorter than an interval between two lattice points in the periodic two-dimensional substrate.

7. The displacement measurement system as claimed in claim 1, wherein an interval between two lattice points in the periodic two-dimensional substrate is shorter than or equal to one micrometer.

8. A displacement measurement method of a displacement measurement system, comprising:

provide a two-dimensional grating, wherein the two-dimensional grating is a periodic two-dimensional substrate, and the periodic two-dimensional substrate is a periodically-arranged hexagonal photonic crystal glass (HPCG);

emitting a coherent light beam into the two-dimensional grating to generate a zero-order light beam and a plurality of first-order diffraction beams, wherein the first-order diffraction beams comprise a first first-order diffraction beam and a second first-order diffraction beam;

receiving the zero-order light beam and the first-order diffraction beams by a photo sensor, wherein the zero-order light beam respectively forms interference fringes arranged in different directions on the photo sensor with the first first-order diffraction beam and the second first-order diffraction beam; and calculating phase differences of the interference fringes in the different directions to obtain displacements of the two-dimensional grating in corresponding directions when the two-dimensional grating moves.

9. The displacement measurement method as claimed in claim 8, further comprising:

obtaining a rotational angle of the two-dimensional grating by calculating a corresponding rotational angle of a diffraction pattern of the first-order diffraction beams when the two-dimensional grating rotates.

10. The displacement measurement method as claimed in claim 8, further comprising:

reflecting the zero-order light beam and the first-order diffraction beams to the photo sensor before the step of receiving the zero-order light beam and the first-order diffraction beams by the photo sensor.

11. The displacement measurement method as claimed in claim 8, further comprising:

regulating the intensity of the zero-order light beam and the first-order diffraction beams entering the photo sensor before the step of receiving the zero-order light beam and the first-order diffraction beams by the photo sensor.

12. The displacement measurement method as claimed in claim 8, wherein the zero-order light beam and the first first-order diffraction beam form the interference fringe arranged in a first direction on the photo sensor, the zero-order light beam and the second first-order diffraction beam form the interference fringe arranged in a second direction on the photo sensor, and the first direction and the second direction are orthogonal.

13. The displacement measurement method as claimed in claim 8, wherein the wavelength of the coherent light beam is shorter than an interval between two lattice points in the periodic two-dimensional substrate.

14. The displacement measurement method as claimed in claim 8, wherein an interval between two lattice points in the periodic two-dimensional substrate is shorter than or equal to one micrometer.

* * * * *